Aug. 10, 1954
C. M. PETERS
2,685,886
PRESSURE RESPONSIVE VALVE
Filed July 23, 1951
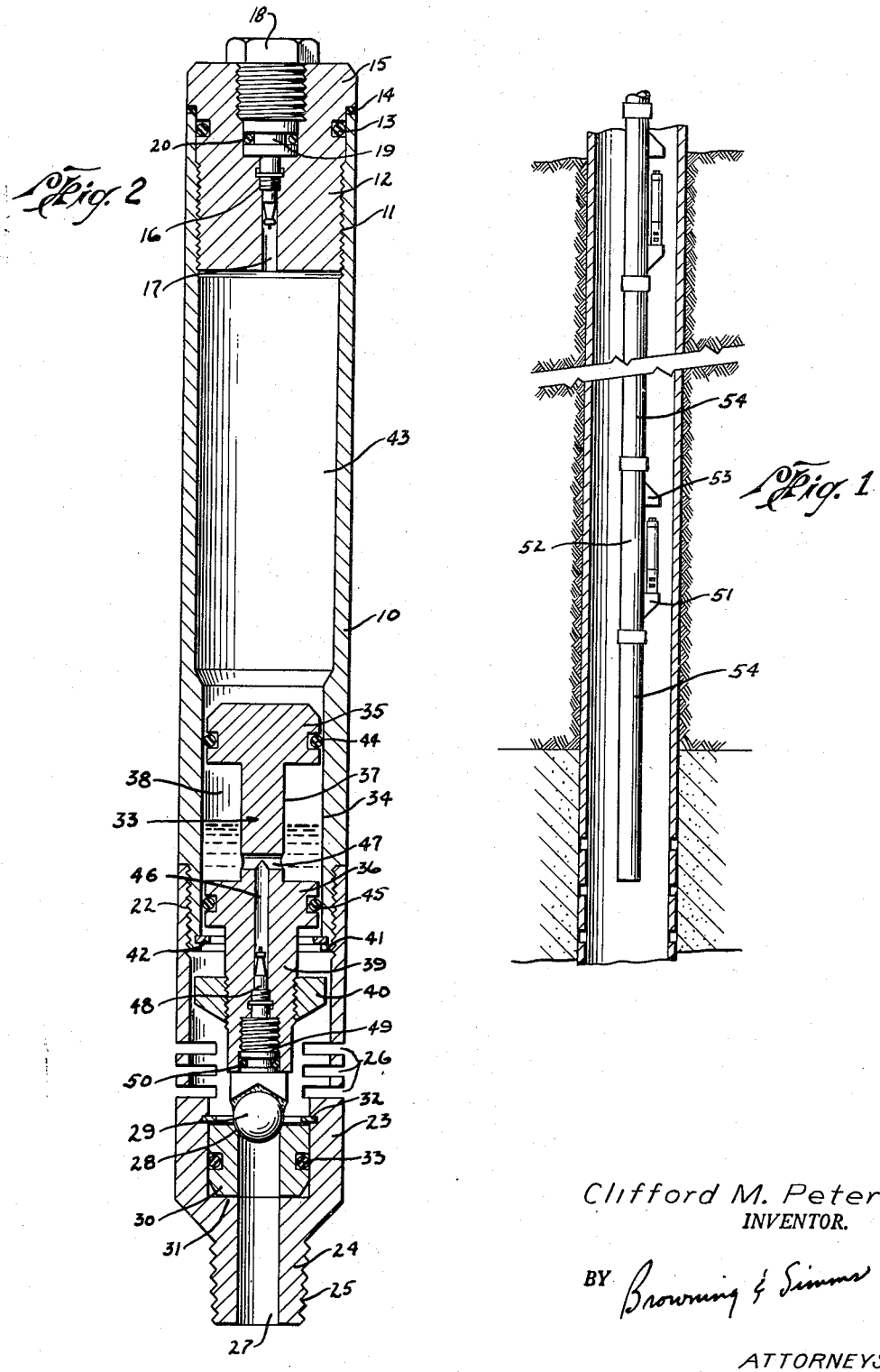
Clifford M. Peters
INVENTOR.
BY Browning & Simms
ATTORNEYS Patented Aug. 10, 1954

2,685,886

UNITED STATES PATENT OFFICE 2,685,886

PRESSURE RESPONSIVE VALVE

Clifford M. Peters, Houston, Tex., assignor to Garrett Oil Tools, Inc., Houston, Tex., a corporation of Texas Application July 23, 1951, Serial No. 238,048

11 Claims. (Cl. 137—155)

1

This invention relates to pressure responsive valves. In one of its aspects, it relates to a valve for controlling the injection of fluid under pressure from one container into another container responsive to a pressure applied to said valve.

Valves of this invention are well adapted for use in gas lift operations in the production of petroleum through well bores and the description of the valve will be directed to its application in this particular field of use. It is to be understood that this is done by way of illustration and not by way of limitation.

Gas lift valves are well known to the prior art. The more successful of the valves heretofore used have employed a bellows to form a pressure seal between the pressure dome and the control fluid in the borehole. However, such bellows often fail in use for one cause or another thereby necessitating replacement of the bellows or even of the entire valve. Further, a bellows sufficiently strong to withstand the large pressure differentials impressed thereon at one time or another is expensive and, being subject to failure, is apt to be the determining factor as to the commercial success of a valve employing the same.

An object of this invention is to provide an economical and simple pressure responsive valve.

Another object of this invention is to provide a pressure responsive valve in which the seal between a pressure dome and an external control fluid is effected without the use of a bellows.

Another object of this invention is to provide a pressure responsive valve wherein a seal is effected between the pressure dome and an external control fluid by a seal means operatively responsive to a pressure differential maintained thereacross.

Another object is to provide a pressure responsive valve with such a seal means so arranged and constructed that a seal will be effected even though the pressure in the pressure dome and the pressure of the external control fluid are of equal magnitude.

Another object of this invention is to provide a pressure responsive valve wherein a pressure differential sealing means disposed between two fluids maintains an operative seal even when the pressure of such fluids becomes equal.

Another object of this invention is to provide a pressure responsive valve wherein a pressure responsive actuating means is provided with a slidable seal comprising an O-ring sealing means and wherein the sealing effectiveness of the O-ring means is maintained by providing a pressure differential thereacross even when the pressure

2 in the pressure dome of the valve is equal to the pressure of the control fluid.

Another object of this invention is to provide a pressure responsive valve which is particularly adapted to be used in gas lift operations in producing a well and wherein a pressure responsive means is exposed to pressure fluids on opposing sides thereof and wherein a seal is effected across said responsive means by a pressure differential sealing means even though the pressures of said fluids may become equal.

Still another object of this invention is to provide a flow control valve actuated responsive to a difference between two pressures applied to opposing sides of a slidable piston wherein said piston is provided with O-ring seals having a pressure differential maintained across them by a pressure fluid reposing in a chamber therebetween.

Other objects, advantages and features of this invention will be apparent to one skilled in the art upon a consideration of the written specification, the appended claims and the attached drawings wherein:

Fig. 1 is a vertical view of a well string illustrating one use of the valve of this invention; and Fig. 2 is a longitudinal cross-sectional view of the valve showing it in closed position.

Like characters of reference are used throughout the two views to designate like parts.

Referring to the drawings, there is illustrated a pressure differential valve having a hollow casing 10 with one end threaded at 11 to receive a correspondingly threaded sealing plug 12. Means for providing a fluid-tight seal between plug 12 and casing 10 can comprise an O-ring 13 received in a peripheral groove around the plug and a gasket 14 between an overhanging shoulder 15 of plug 12 and the end of the casing.

Plug 12 is provided with a means for passing a pressure fluid therethrough into the interior of casing 10 for a purpose to be hereafter explained. Such means comprises a check valve 16 threaded into passage 17 through the plug to admit fluid through such passage into casing 10 but to prevent flow in an opposite direction. To provide a sealing back up for the check valve, back-up plug 18 is threaded into an enlarged diameter portion of passage 17 and has a peripheral groove 19 receiving O-ring 20 in sealing relationship with such enlarged diameter portion.

With this construction, back up plug 18 can be removed from plug 12 and a pressure fluid injected into casing 10 through check valve 16 and, after the desired amount of fluid has been injected, plug 18 can be replaced to additionally assure against fluid leakage from the casing through passage 17.

Attached to the other end of casing 10 as by threaded connection 22 is a valve cage 23 which can be considered as an extension or as a part of casing 10. One end of the valve cage has a reduced diameter portion 24 bearing threads 25 by which the valve can be attached to a container such as the flow string of a well.

The valve cage is provided with a flow passage therethrough between fluid inlet ports 26, formed by chordally cutting through the walls of the valve cage, and fluid discharge port 27. Disposed between such ports is a valve means comprising a valve seat 28 and a valve member 29 to control the flow of fluid from one port to the other. The valve seat can be formed on a seating member 30 received in the valve cage against shoulder 31 and maintained in position by a snap-in ring 32. A suitable seal can be provided between the seating member and the adjacent walls of the valve cage by an O-ring 33 received in a peripheral groove in the valve member.

The valve member 29 is adapted to be seated in seat 28 and to be unseated therefrom by a pressure responsive means connected thereto, the pressure responsive means being exposed on one side to an enclosed fluid pressure within the valve casing and on its other side to the pressure of a control fluid internal of the valve cage as impressed through ports 26.

The pressure responsive means comprises a piston 33 slidably received in a cylinder 34 which is formed internally of casing 10. The piston is formed with two end portions 35 and 36 having a slightly smaller diameter than that of cylinder 34 so as to be slidable and yet have a snug fit therein. These portions are joined by a connection 37 of substantially less cross-sectional area than that of cylinder 34 so as to form a sealing pressure chamber 38 between piston portions 35 and 36.

Piston 33 is connected by a valve stem 39 to valve member 29 so that movement of the piston will result in a like movement of the valve member to seat and unseat the same. A stop nut 40 can be threaded to the valve stem in such a position as to abut shoulder 41 on casing 10 when the valve is open and thereby limit movement of piston 33 in its cylinder. Sufficient clearance is provided between nut 40 and cage 23 to permit ready access of control pressure fluid from ports 26 to the exposed surface of piston portion 36.

A stop means such as snap-in ring 42 is provided between piston 33 and the end of cylinder 34 so that when cage 23 is removed from the valve, the movement of piston 33 completely out of its cylinder will be prevented. Of course, this stop means will not operate to limit movement of the piston when the valve cage is in place for the seating of valve member 29 on seat 28 will then act as a stop means.

With this construction as just described, it will be seen that there is provided a pressure dome defining a substantially constant pressure fluid chamber 43 into which fluid can be injected for charging the same to any desired pressure in order to exert a substantially constant force, under isothermal conditions, on the endwise face of piston portion 35 to urge valve member 29 to a seated position and thereby close port 27. Also, there is provided an opposing endwise face on piston portion 36 on which control fluid will exert a force tending to unseat the valve member. Thus, the piston is operable to govern actuation of the valve member to control flow through the fluid passage of port 27 responsive to variations in pressure of a control fluid to which the piston is exposed.

In accordance with this invention, at least two spaced apart sealing means are provided for affecting a sliding seal between the piston and the walls of the casing or cylinder in which it slides to prevent fluid charged into the pressure dome from escaping therefrom and to prevent control fluid from bleeding into the pressure dome. These sealing means are of the type which require a pressure differential thereacross to effect their sealing actions and are illustrated as O-rings 44 and 45 received in respective peripheral grooves in piston portions 35 and 36. In order to assure a positive pressure differential across each of the sealing means, sealing pressure chamber 38 is provided therebetween to be in pressure communication with each sealing means and is adapted to be charged with a pressure fluid at a pressure having a larger or smaller magnitude than that existing in chamber 43 as will be discussed more fully below.

Means for charging sealing chamber 38 with pressure fluid can comprise passage 46 through the valve stem with endwise ports 47. Disposed within the passage is a check valve 48 permitting fluid flow into the chamber but preventing flow therefrom. A back-up sealing plug 49 for this valve is threadedly received in an enlarged portion of passage 46 and has an O-ring 50 to complete the seal. Valve member 29 is attached to the other end of this back-up plug.

With the valve constructed as in Fig. 2, plug 49 can be removed and sealing chamber 38 charged with fluid under pressure. The pressure impressed in this chamber is preferably substantially higher than that within the pressure dome and also higher than the maximum pressure of the control fluid. Thus, for example, when piston portions 35 and 36 are of equal area and the pressure dome is to be charged to say 500 p. s. i., then sealing chamber 38 can be charged to a pressure of 700 p. s. i. to thereby maintain an effective sealing differential across O-ring 44 of 200 p. s. i. Since the control fluid will cause the piston to unseat valve member 29 at a pressure slightly in excess of 500 p. s. i. in this example, the pressure in the sealing chamber will likewise maintain an effective differential pressure across O-ring 45. In this manner, a sealing differential is maintained across O-rings 44 and 45 even when the control fluid pressure equals that in the pressure dome.

While it is preferred to maintain a pressure in sealing chamber 38 higher than that in the pressure dome, such pressure can be lower so long as a differential is maintained across O-rings 44 and 45 during a substantial portion of the operating cycle.

The magnitude of the pressure differential to be maintained across the pressure differential responsive sealing means 44 and 45 can be varied with certain variations in results. With high pressure differentials, e. g. 1500 p. s. i., and when using O-rings as the sealing means, the usual O-ring tends to flow into and assume the shape of the groove or cavity in which it is received and to become very tightly pressed into the narrow annulus between the piston and its cylinder. As a result, frictional resistance to movement of the piston increases with a concomitant decrease in sensitivity of the valve. Preferably, the fluid pressure differential across these O-rings, particularly O-ring 44, is maintained within the range of 125 to 300 p. s. i. or, in other words, low enough to permit the O-rings to have a rolling action, i. e. to roll about their circumferential axis, and yet high enough to effectively maintain them in sealing relationship between the piston and its cylinder. This rolling action decreases frictional resistance to movement of the piston and, accordingly, permits an increased sensitivity of the valve. The most effective sealing pressure differential consistent with desired valve sensitivity is partially dependent upon the quality and construction of the O-ring and upon the physical characteristics, e. g. viscosity, of the fluids sealed against. The optimum differential for any given set of operating conditions can be determined by mere routine test.

It is preferred to charge both of chambers 43 and 38 to be partially filled with liquid and to then employ a gas as the pressurizing fluid. In this manner, liquid is maintained against O-ring 44 by the liquid in chamber 43 while the liquid in chamber 38 is maintained against O-ring 45 to thereby ensure lubrication of the O-rings. It is contemplated that a gaseous fluid can be used exclusively in either or both chambers but it will not provide the desired lubrication.

The valve of Fig. 2 can be used as a gas lift valve as shown in Fig. 1 by screwing it into a projecting member 51 attached to conduit section 52 and having a passage communicating with the interior thereof from port 27. A protecting member 53 can be provided above each of the valves to prevent it from striking the walls of the casing when the flow string is being run in or pulled out of the bore hole. Conduit sections 52 with valves attached can be inserted between lengths 54 of the regular flow string in a manner known to the art.

In operation, a control fluid is pressured into the casing externally of the flow string and acts through ports 26 on the endwise surface of piston portion 36 to unseat valve member 29 and permit the control fluid to flow across the valve seat, through port 27 and thence into the flow string. Since pressure chamber 43 (the pressure dome) has been previously charged to a predetermined pressure through plug 12, the force exerted by the control fluid on piston portion 36 must exceed somewhat the force of the pressure within the pressure dome on piston portion 35 to open the valve. When the control fluid pressure drops below such required value, the valve will close. Sealing chamber 38 has also been previously charged to a pressure substantially above or below that in the pressure dome and accordingly, a pressure differential will always be maintained across the O-ring seals 44 and 45.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

This invention having been described, what is claimed is:

1. In a pressure responsive valve, the combination which comprises, a hollow casing having a flow passage therethrough, a valve member for controlling flow through said passage, pressure responsive means within said casing coacting with said valve member to control flow through said passage responsive to pressure variations in a control fluid to which the pressure responsive means is exposed, a first pressure chamber formed in part by said pressure responsive means, at least two sealing means disposed to effect a sliding seal between said pressure responsive means and said casing, said sealing means being structurally of the type which has an increased sealing effectiveness responsive to a pressure differential across each of them, a sealing pressure chamber intermediate said sealing means, and means for charging said sealing pressure chamber with a fluid at a predetermined pressure substantially different from that of said first pressure chamber whereby a predetermined differential can be normally maintained across said sealing means.

2. In a pressure responsive valve, the combination which comprises, a hollow casing having inlet and outlet fluid flow ports, a valve member for controlling flow of fluid through said ports, a piston slidably received in said casing to form a first pressure chamber therein, said piston being connected to said valve member to actuate the same responsive to pressure variations in a control fluid to which the piston is exposed, at least two sealing means disposed between said piston and said casing to effect a sliding seal therebetween, the sealing means being of the type which has an increased sealing power responsive to a pressure differential thereacross, a sealing pressure chamber intermediate said sealing means for receiving a pressure fluid, and means for charging said sealing pressure chamber with said pressure fluid at a predetermined pressure so as to thereby maintain a pressure differential across said sealing means.

3. The valve of claim 2 wherein said sealing means are O-rings.

4. The valve of claim 3 wherein said sealing pressure chamber is formed by a reduced cross-sectional area portion of said piston intermediate its ends and said sealing means.

5. In a pressure responsive valve, the combination which comprises, a hollow casing having a fluid passage therethrough, a valve member and a seat disposed in said passage, a piston slidably received in said casing and connected to said valve member, said piston extending across said casing to expose a first endwise face to a first pressure chamber formed thereby in said casing, said piston also having an opposite endwise face adapted to be exposed to the pressure of a control fluid so that said piston can actuate said valve member responsive to variations in pressure of said control fluid, at least two O-ring sealing means between said piston and said casing to form a sliding seal therebetween, a sealing pressure chamber between said O-rings having communication therewith, and means for charging said sealing pressure chamber with a resilient fluid at a predetermined pressure differing from that of said first pressure chamber and from that to which said opposite endwise face of said piston is normally exposed.

6. The valve of claim 5 wherein said piston is connected to said valve member by a valve stem and wherein said means for charging said sealing pressure chamber includes a charging passage through said valve stem and communicating with said sealing pressure chamber and a check valve in said charging passage permitting flow into said sealing pressure chamber.

7. In a pressure responsive valve, the combination which comprises, a hollow casing having one end closed and having a flow passage with a valve member for controlling fluid flow therethrough, a piston slidably received in said casing to form a first pressure chamber with the closed end portion thereof, said piston having a reduced diameter portion intermediate its end portions to form a sealing pressure chamber, an O-ring on each of the end portions to provide a sliding seal with said casing, a valve stem connecting said piston to said valve member, and a check valve controlled passage into said sealing pressure chamber.

8. The valve of claim 7 wherein said first pressure chamber contains a pressure fluid and said sealing pressure chamber contains a pressure fluid at a pressure substantially different from that within said first pressure chamber whereby a pressure differential is maintained across said O-rings.

9. As a subcombination, a hollow casing having one end closed, a piston slidably received in said casing to form a pressure chamber with the closed end portion thereof, said piston having a reduced cross-sectional area portion intermediate its end portions to form a sealing pressure chamber with said casing, and sealing means on each of the end portions of said piston and of the type which form a seal responsive to a pressure differential thereacross, said sealing pressure chamber being in fluid communication with each of said sealing means and charged with a resilient fluid at a pressure differing from that of first said pressure chamber and from that to which the end of the piston remote from first said pressure chamber is normally exposed.

10. The subcombination of claim 9 wherein said sealing means are O-rings.

11. The subcombination of claim 9 in combination with means for charging fluid into said sealing pressure chamber.

References Cited in the file of this patent

UNITED STATES PATENTS

| Number | Name | Date |
|---|---|---|
| 1,545,936 | Black | July 14, 1925 |
| 1,975,345 | Baker | Oct. 2, 1934 |
| 2,211,456 | Caldwell | Aug. 13, 1940 |
| 2,314,869 | Blynton | Mar. 30, 1943 |
| 2,345,865 | Boynton | Apr. 4, 1944 |
| 2,471,605 | Broeze | May 31, 1949 |
| 2,509,839 | Panner | May 30, 1950 |
| 2,519,242 | Garrett | Aug. 15, 1950 |
| 2,611,671 | Jirsa | Sept. 23, 1952 |